United States Patent [19]

Han

[11] Patent Number: 5,825,727
[45] Date of Patent: Oct. 20, 1998

[54] APPARATUS AND METHOD FOR SELECTING MULTI-ANGLE OF DIGITAL VIDEO DISC

[75] Inventor: Seog Yeon Han, Kyungki-do, Rep. of Korea

[73] Assignee: LG Electronics Inc., Seoul, Rep. of Korea

[21] Appl. No.: 866,301

[22] Filed: May 30, 1997

[30] Foreign Application Priority Data

Jun. 29, 1996 [KR] Rep. of Korea .................. 1996/26109

[51] Int. Cl.[6] .............................. G11B 17/22; G11B 3/90
[52] U.S. Cl. ................................. 369/32; 369/47; 369/54
[58] Field of Search ................................. 369/32, 47, 54

*Primary Examiner*—Tod R. Swann
*Assistant Examiner*—Kim-Kwok Chu

[57] ABSTRACT

An apparatus for selecting multi-angle of a DVD which plays a digital signal formatted in a disc through an optical pickup, includes a memory for storing an angle block set by a user, a controller for outputting angle varying command depending on the set angle block and time periods if the angle block has been set in the memory in the event of playing the DVD, and a servo for playing data corresponding to the angle screen at a predetermined period by jumping the optical pickup to a corresponding angle data depending on the angle varying command of the controller. A method for selecting multi-angle of a DVD includes the steps of displaying an OSD screen which provides a menu screen, setting a user's desired angle block and time periods, and storing the set angle block and time periods. The apparatus and method for selecting multi-angle of a DVD permits the user to set and store a plurality of desired angles using the OSD and then to repeatedly play data corresponding to angle blocks selected at time periods or video object unit. As a result, it is possible to offer a film scene or a live concert scene on a more vivid screen by variously varying the angle. There is no need of manipulating the key buttons of the angles one by one in order to vary the angle. This provides the user with convenience and also reduces the manufacturing costs.

12 Claims, 6 Drawing Sheets

FIG.3

| angle block display | | | time |
|---|---|---|---|
| 1. Angle 1 → | Angle 2 → | Angle 1 | 10 seconds |
| 2. Angle 3 → | Angle 7 → | Angle 9 | 30 seconds |
| | → Angle 3 | | |
| 3. Angle 9 → | Angle 1 → | Angle 9 | |

APPARATUS AND METHOD FOR SELECTING MULTI-ANGLE OF DIGITAL VIDEO DISC

BACKGROUND OF THE INVENTION

1. Field of the Invention

The present invention relates to an apparatus and method for selecting an angle of a digital video disc (DVD), and more particularly, to an apparatus and method for selecting multi-angle of a DVD in which a stream for selecting an angle is programmed per video object unit or time periods.

2. Discussion of the Related Art

Generally, a DVD provides nine angle screens. Image data of the respective angles are formatted in a disc by disc manufacturers. In this respect, there can be provided a vivid screen by playing data corresponding to a variety of angles for a film scene or a live concert scene while variously varying the angle.

However, a conventional DVD permits a user to select one angle screen so as to play data corresponding to it. In other words, the user can select only one of a plurality of angle screens and data corresponding to the selected angle screen is only played. There results in inconvenience that the user has to manipulate the respective angle key buttons one by one in order to vary the angle screen. In addition, additional costs are caused by mounting the key buttons corresponding to the respective angle screens.

SUMMARY OF THE INVENTION

Accordingly, the present invention is directed to an apparatus and method for selecting multi-angle of a DVD that substantially obviates one or more of the problems due to limitations and disadvantages of the related art.

An object of the present invention is to provide an apparatus and method for selecting multi-angle of a DVD in which a plurality of angle data can be selected by a user and played repeatedly at certain time periods.

Other object of the present invention is to provide an apparatus and method for selecting multi-angle of a DVD in which a user can select its desired angles using on-screen display (OSD) to play angle data corresponding to an angle screen having the angles for a predetermined time period by controlling a servo.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for selecting a multi-angle of a DVD which plays a digital signal formatted in a disc through an optical pickup, includes a memory for storing an angle block having a plurality of angles set by a user, a controller for outputting angle varying command depending on the set angle block and time periods if the angle block has been set in the memory in the event of playing the DVD, and a servo for playing data corresponding to an angle screen for the set angle block at a predetermined time period by jumping the optical pickup to a corresponding angle data depending on the angle varying command of the controller.

In another aspect, an apparatus for selecting a multi-angle of a DVD includes an on-screen display portion for providing a menu screen in order for a user to set a desired angle block and time periods, a memory for storing the angle block set by the user, a controller for outputting angle varying command depending on the set angle block and time periods if the angle block has been set in the memory in the event of playing the DVD, and a servo for playing data corresponding to an angle screen for the set angle block at a predetermined time period by jumping the optical pickup to a corresponding angle data depending on the angle varying command of the controller.

In still another aspect, a method for selecting a multi-angle of a DVD includes the steps of displaying an OSD screen which provides a menu screen, setting a user's desired angle block which includes a plurality of angles and time periods, and storing the set angle block and time periods.

In other aspect, a method for selecting multi-angle of a DVD includes the steps of determining whether or not an angle block has been set in the event of playing the DVD, outputting angle varying command depending on the set angle block and time periods if the angle block has been set, and playing data corresponding to an angle screen for the set angle block at a predetermined time period by jumping the optical pickup to a corresponding angle data depending on the angle varying command.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 shows an example of a menu screen of an angle block using an OSD according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
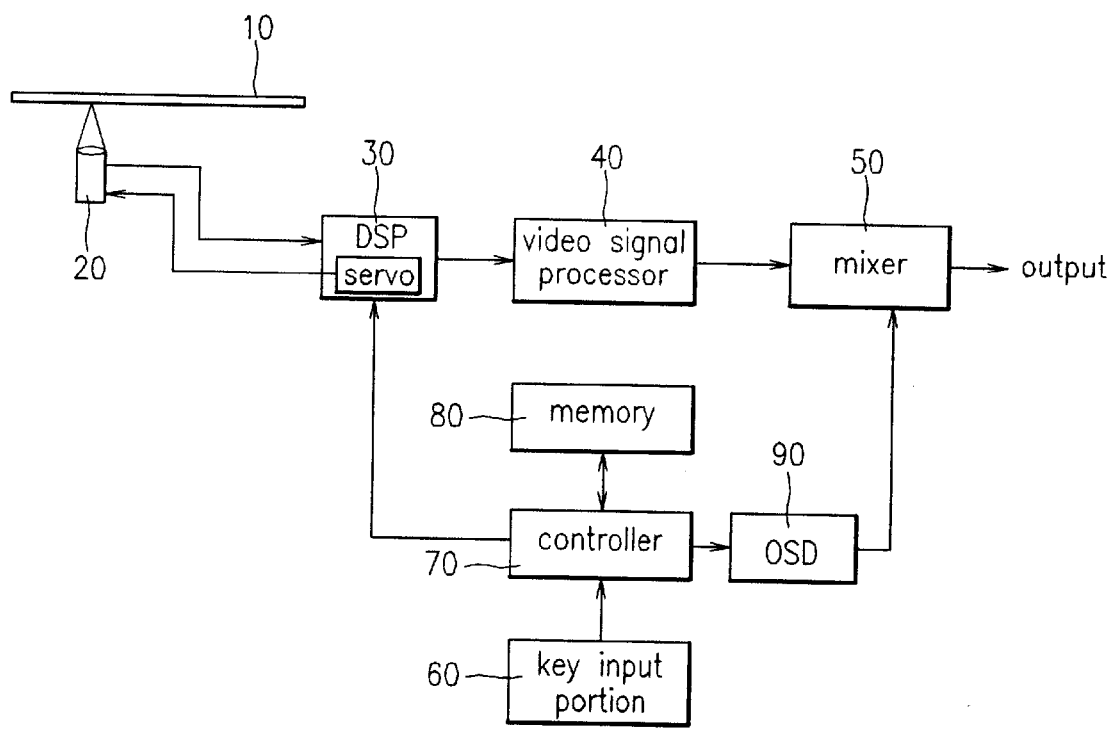
FIG. 1 is a block diagram illustrating an apparatus for selecting multi-angle according to the present invention.

FIG. 1 is a block diagram illustrating an apparatus for selecting multi-angle according to the present invention.

Referring to FIG. 1, an apparatus for selecting a multi-angle includes an optical pickup 20, a digital signal processor 30, a video signal processor 40, a key input portion 60, a microcomputer unit (hereinafter, referred to as "controller") 70, a memory 80, an OSD portion 90, and a mixer 50.

The optical pickup 20 plays data recorded in a disc 10 by detecting light which is reflected through incident light upon the disc 10. The digital signal processor 30 amplifies and stabilizes the data read out from the optical pickup 20 to output it as a digital signal and, at the same time, controls tracking and focusing. The video signal processor 40 restores the video signal from the digital signal processor 30 to original data. The key input portion 40 inputs a key signal to set a menu, a timer, and an angle. The controller 70 controls the selection of a plurality of angles in response to the key signal of the key input portion 60, and also controls storage and play of data corresponding to the selected angles. The memory 80 stores executive and application programs required for the controller 70. The OSD portion 90 processes a menu screen by an OSD character under the control of the controller 70. The mixer 50 mixes the output signal of the video signal processor 40 with the output signal of the OSD portion 90.

Figure 2:
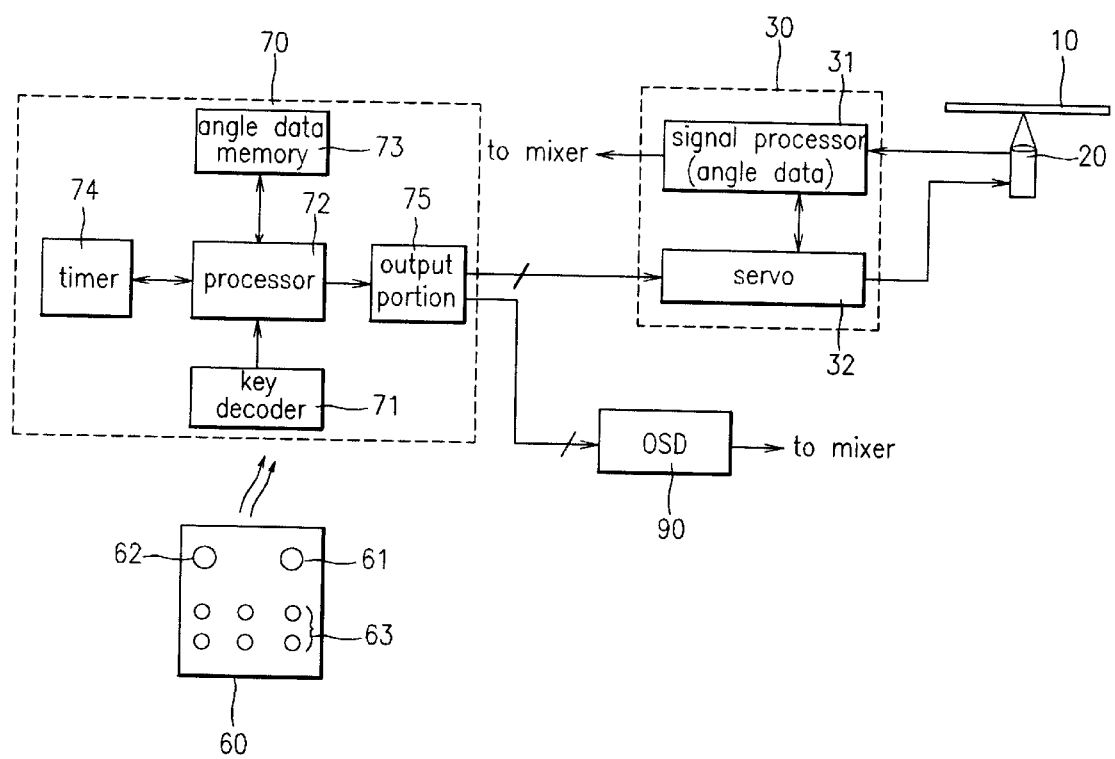
FIG. 2 is a detailed block diagram of FIG. 1.

As illustrated in FIG. 2, the key input portion 60 includes an angle selecting key 61, an angle setting key 62 and a number key 63. The controller 70 includes a key decoder 71 for decoding the key signal of the key input portion 60, a processor 72 for processing storage of the angle data, checking a timer, and controlling an output value of the angle data in response to the decoded value of the key decoder 71, an angle data memory 73 for storing angle data set by a user under the control of the processor 72, a timer 74, and an output portion 75 for outputting the angle data and a servo control signal under the control of the processor 72.

Figure 4:
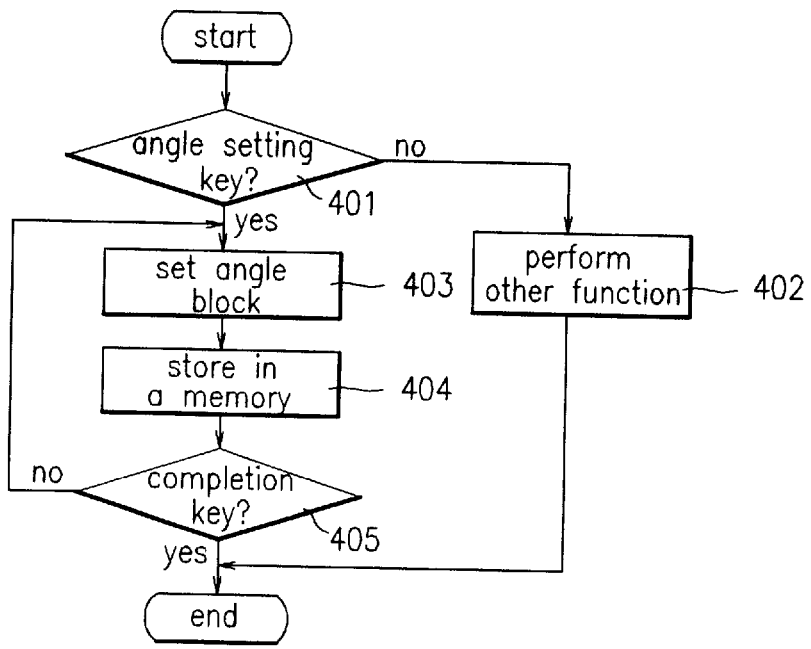
FIG. 4 is a flow chart illustrating the steps of setting and storing multi-angle according to the present invention.
Figure 5:
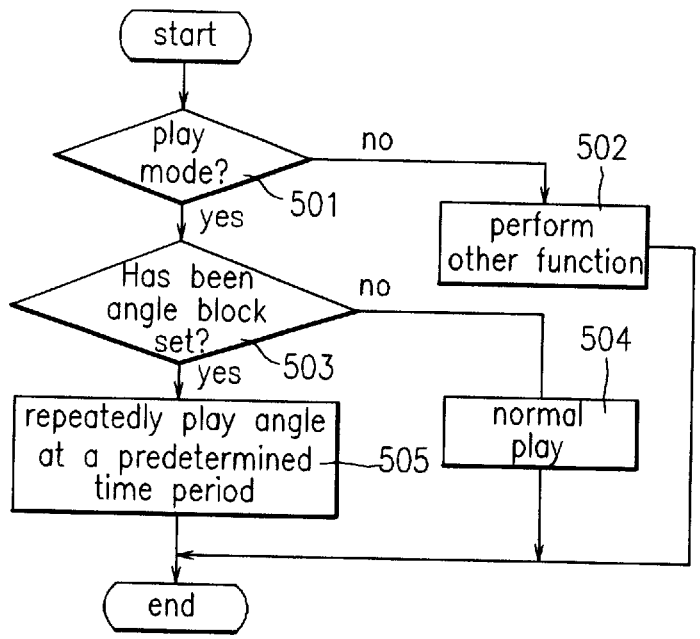
FIG. 5 is a flow chart illustrating the step of playing data corresponding to multi-angle according to the present invention.
Figure 6:
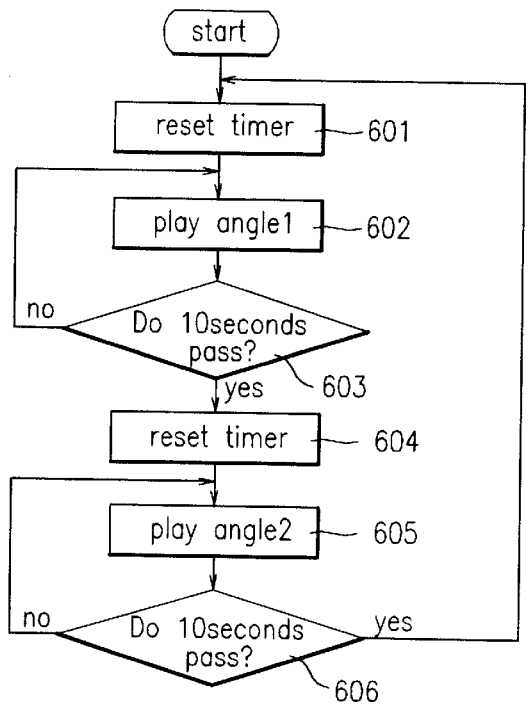
FIG. 6 is a flow chart illustrating the step of playing data corresponding to multi-angle in the case that a timer has been set, according to the present invention.
Figure 7:
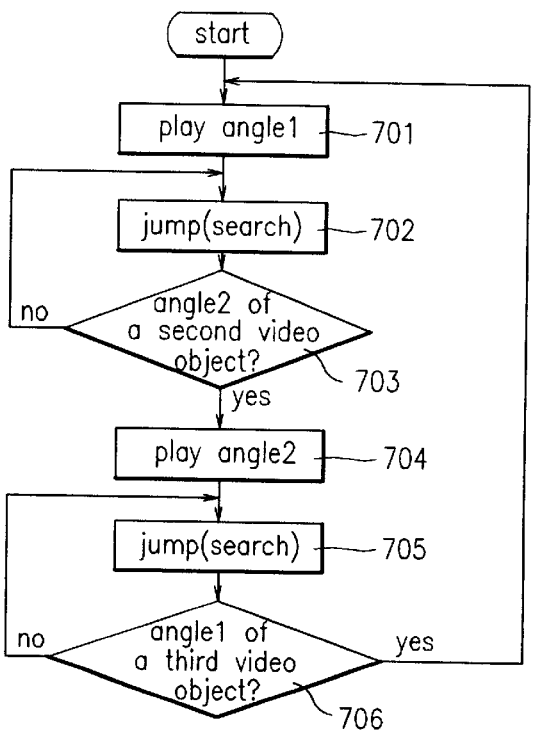
FIG. 7 is a flow chart illustrating the step of playing data corresponding to multi-angle in the case that a timer has not been set, according to the present invention.

FIG. 4 is a flow chart illustrating the steps of setting angles and storing the set angles according to the present invention. FIG. 5 is a flow chart illustrating the step of playing the stored angle data according to the present invention. FIG. 6 and FIG. 7 are flow charts illustrating the embodiment of FIG. 5. FIG. 6 is a flow chart illustrating the step of playing angle data, i.e., angle 1→angle 2→angle 1→ . . . , at 10 seconds interval. FIG. 7 is a flow chart illustrating the step of playing angle data, i.e., angle 1→angle 2→angle 1→ . . . , at video object unit without setting a timer.

In the present invention as aforementioned, the optical pickup 20 reads out the data recorded in the disc 10 using light which is reflected through incident light upon the disc 10. The data read out from the optical pickup 20 is amplified and stabilized by the video signal processor 30 and is output to the video signal processor 40 as a digital signal. The video signal processor 40 restores compressed data and displays the video signal on a screen through the mixer 50.

Meanwhile, the user can set a plurality of angle blocks using the key of the key input portion 60. In other words, if the angle setting key 62 of the key input portion 60 enters in step 401, as illustrated in FIG. 4, the key decoder 71 of the controller 70 decodes the input key signal and then outputs it to the processor 72. The processor 72 determines whether or not the input key is the angle setting key and controls the OSD portion 90 through the output portion 75, so as to display the OSD menu screen.

At this time, the user can select a plurality of the angles using the angle selecting key of the key input portion 60 in step 403.

For example, if the angles are set in the order of angle 1→angle 2→angle 1→ . . . , at 10 seconds interval to be played, the angles are displayed as number 1 of FIG. 3 through the OSD portion 90 and the mixer 50. The angles are then stored in the angle data memory 70 under the control of the processor 72 in step 404.

If the angles, i.e., angle 9→angle 1→angle 9 . . . , are set to play without setting the timer, the angles are displayed as number 3 of FIG. 3 through the OSD portion 90 and the mixer 50, so that they are stored in the angle data memory 70.

If a desired angle block and time periods are completely set by repeating such steps, a completion key is input to complete setting of the angle block in step 405.

Thereafter, the user inputs the angle setting key to select the angle. The angle menu stored in the angle data memory 73 by the user is then displayed. As a result, the user may select the angle block set by inputting the corresponding number or may newly select a plurality of the angle blocks.

Meanwhile, in the event of playing the digital signal formatted in the disc, if the user selects the angle block displayed on the OSD screen, the selected angle block is highlighted and the angle block corresponding to the selected number is played.

At this time, the processor 72 outputs the servo control signal through the output portion 75 to the servo 32 so as to read out the selected angle in the event of playing the DVD. The servo 32 controls tracking and focusing of the optical pickup 20 to play the corresponding angle data.

In other words, in step 501, it is determined whether or not the angle is in play mode. If the angle is not in play mode, the other operation is performed in step 502. If the angle is in play mode, in step 503, it is determined whether or not the angle block has been set. If the angle block has not been set, a normal play is performed in step 504. If the angle block has been set, data corresponding to the set angle block is repeatedly played at a predetermined period in step 505. In playing data corresponding to the angle block in step 505, it is possible to play data corresponding to the angle block while varying the angle at time periods, if the timer has been set the event of setting the angle block as illustrated in FIG. 6. That is, if the timer has been set, the processor 72 instructs jump command to the servo 32 through the output portion 75 and outputs angle varying command to the servo 32 whenever the set time reaches. The servo 32 performs jump depending on angle varying command while reading out the required data through the optical pickup 20.

Moreover, in playing data corresponding to the angle block in step 505, it is possible to play data corresponding to the angle block while varying the angle at video object unit, if the timer has not been set in the event of setting the angle block as illustrated in FIG. 7. That is, although the timer has not been set, the processor 72 instructs jump command to the servo 32 through the output portion 75 and, at the same time, outputs angle varying command to the servo 32 at video object unit.

FIG. 6 is a flow chart illustrating the step of playing angle data, i.e., angle 1→angle 2→angle 1→ . . . , at 10 seconds interval.

Referring to FIG. 6, the timer 74 is reset in step 601, and the angle 1 is played for 10 seconds in step 602 and step 603. If 10 seconds pass, the timer 74 is reset again in step 604, and the angle 2 is played for 10 seconds in step 605 and step 606. Such steps repeat while reading out the designated angle data at time periods set in the event of playing the angle data. At this time, the optical pickup 20 performs track jump while reading out only the required data.

Meanwhile, FIG. 7 is a flow chart illustrating the step of playing angle data, i.e., angle 1→angle 2→angle 1→ . . . at video object unit without setting a timer.

Figure 8:
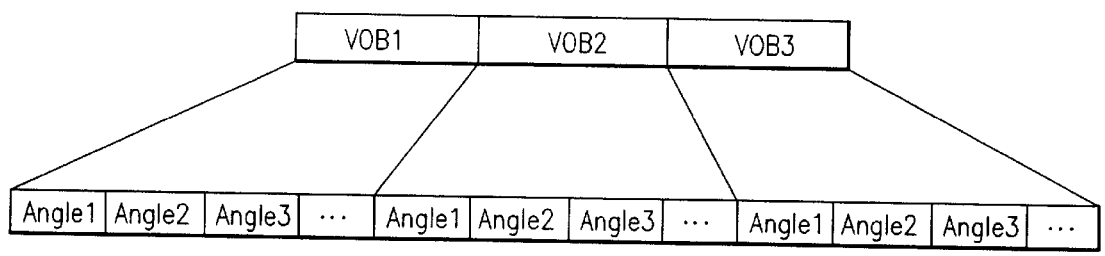
FIG. 8 shows angle blocks of which data is played per video object unit.

Referring to FIG. 7, in step 701, the angle 1 is played at a first video object VOB1 as illustrated in FIG. 8. In step 702, track jump of the optical pickup is performed to search the angle 2 of a second video object VOB2. If the angle 2 has not been searched at the second video object VOB2, such a track jump continues to search the angle 2 of the second video object VOB2 in step 704. If the angle 2 has been searched, the angle 2 of the second video object VOB2 is played in step 704. If the play of the angle 2 is completed, track jump of the optical pickup is performed to search the angle 1 of a third video object VOB3 in step 705. If the angle 1 of the third video object VOB3 has not been searched, track jump continues to search the angle 1 of the third video object VOB3. If the angle 1 of the third video object VOB3 has been searched, it is played.

Such steps of reading out the angle data designated by video object unit repeat.

As aforementioned, the apparatus and method for selecting the multi-angle of the DVD according to the present invention has the following advantages.

First, the apparatus for selecting the multi-angle of the DVD according to the present invention permits the user to set and store a plurality of desired angle data using the OSD and then to repeatedly play data corresponding to angle blocks selected at time periods or video object unit. As a result, it is possible to offer a film scene or a live concert scene on a more vivid screen by variously varying the angle.

There is no need of manipulating the key buttons of the angles one by one in order to vary the angles. This provides the user with convenience. In addition, there is no need of mounting additional keys corresponding to the respective angles. This reduces the manufacturing costs.

It will be apparent to the art that various modifications and variations can be made in the apparatus and method for selecting the multi-angle of the DVD according to the present invention without departing from the spirit or scope of the invention. Thus, it is intended that the present invention covers the modifications and variations of the invention provided they come within the scope of the appended claims and their equivalents.

What is claimed is:

1. An apparatus for selecting a multi-angle of a digital video disc (DVD) which plays a digital signal formatted in a disc through an optical pickup, comprising:

a memory means for storing an angle block having a plurality of angles set by a user;

a controlling means for outputting angle varying command depending on the set angle block and time periods if the angle block has been set in the memory means in the event of playing the DVD; and a servo for playing data corresponding to an angle screen for the set angle block at a predetermined time period by jumping the optical pickup to a corresponding angle data depending on the angle varying command of the controlling means.

2. The apparatus for selecting a multi-angle of a DVD as claimed in claim 1, wherein the controlling means outputs control command to the servo to play data corresponding to a plurality of the set angles by varying them at time periods.

3. The apparatus for selecting a multi-angle of a DVD as claimed in claim 1, wherein the controlling means outputs control command to the servo to play data corresponding to a plurality of the set angles by varying them at video object unit.

4. An apparatus for selecting a multi-angle of a DVD which plays a digital signal formatted in a disc through an optical pickup, comprising:

an on-screen display means for providing a menu screen in order for a user to set a desired angle block and time periods;

a memory means for storing the angle block set by the user;

a controlling means for outputting angle varying command depending on the set angle block and time periods if the angle block has been set in the memory means in the event of playing the DVD; and a servo for playing data corresponding to an angle screen for the set angle block at a predetermined time period by jumping the optical pickup to a corresponding angle data depending on the angle varying command of the controlling means.

5. The apparatus for selecting a multi-angle of a DVD as claimed in claim 4, wherein the controlling means outputs control command to the servo to play data corresponding to the set angle block at a predetermined time period if a timer has been set in the set angle block.

6. The apparatus for selecting a multi-angle of a DVD as claimed in claim 4, wherein the controlling means outputs control command to the servo to play data corresponding to the set angle block at video object unit if a timer has not been set in the set angle block.

7. A method for selecting a multi-angle of a DVD which plays a digital signal formatted in a disc through an optical pickup, comprising the steps of:

displaying an OSD screen which provides a menu screen;

setting a user's desired angle block which includes a plurality of angles and time periods; and storing the set angle block and time periods.

8. The method for selecting a multi-angle of a DVD as claimed in claim 7, wherein the time periods are set by a timer to play data corresponding to a plurality of angle screens in the event of setting the angle block.

9. The method for selecting a multi-angle of a DVD as claimed in claim 7, wherein the time periods are set by video object unit to play data corresponding to a plurality of angle screens in the event of setting the angle block.

10. A method for selecting a multi-angle of a DVD which plays a digital signal formatted in a disc through an optical pickup, comprising the steps of:

determining whether or not an angle block has been set in the event of playing the DVD;

outputting angle varying command depending on the set angle block and time periods if the angle block has been set; and playing data corresponding to an angle screen for the set angle block at a predetermined time period by jumping the optical pickup to a corresponding angle data depending on the angle varying command.

11. The method for selecting a multi-angle of a DVD as claimed in claim 10, wherein the step of playing data corresponding to the angle screen repeats in the order of:

playing a designated angle data from the set angle block for a predetermined time period by resetting a timer; and playing a next designated angle data from the set angle block for a predetermined time period by resetting again the timer if the step of playing the designated angle data is completed.

12. The method for selecting a multi-angle of a DVD as claimed in claim 10, wherein the step of playing data corresponding to the angle screen repeats in the order of:

a first step of playing a designated angle data of a first video object;

a second step of jumping the optical pickup to a designated angle data of a second video object if the first step has been completed;

a third step of playing the designated angle data of the second video object; and a fourth step of playing a designated angle data of a third video object by jumping the optical pickup to the designated angle data of the third video object if the third step has been completed.

* * * * *